UNITED STATES PATENT OFFICE.

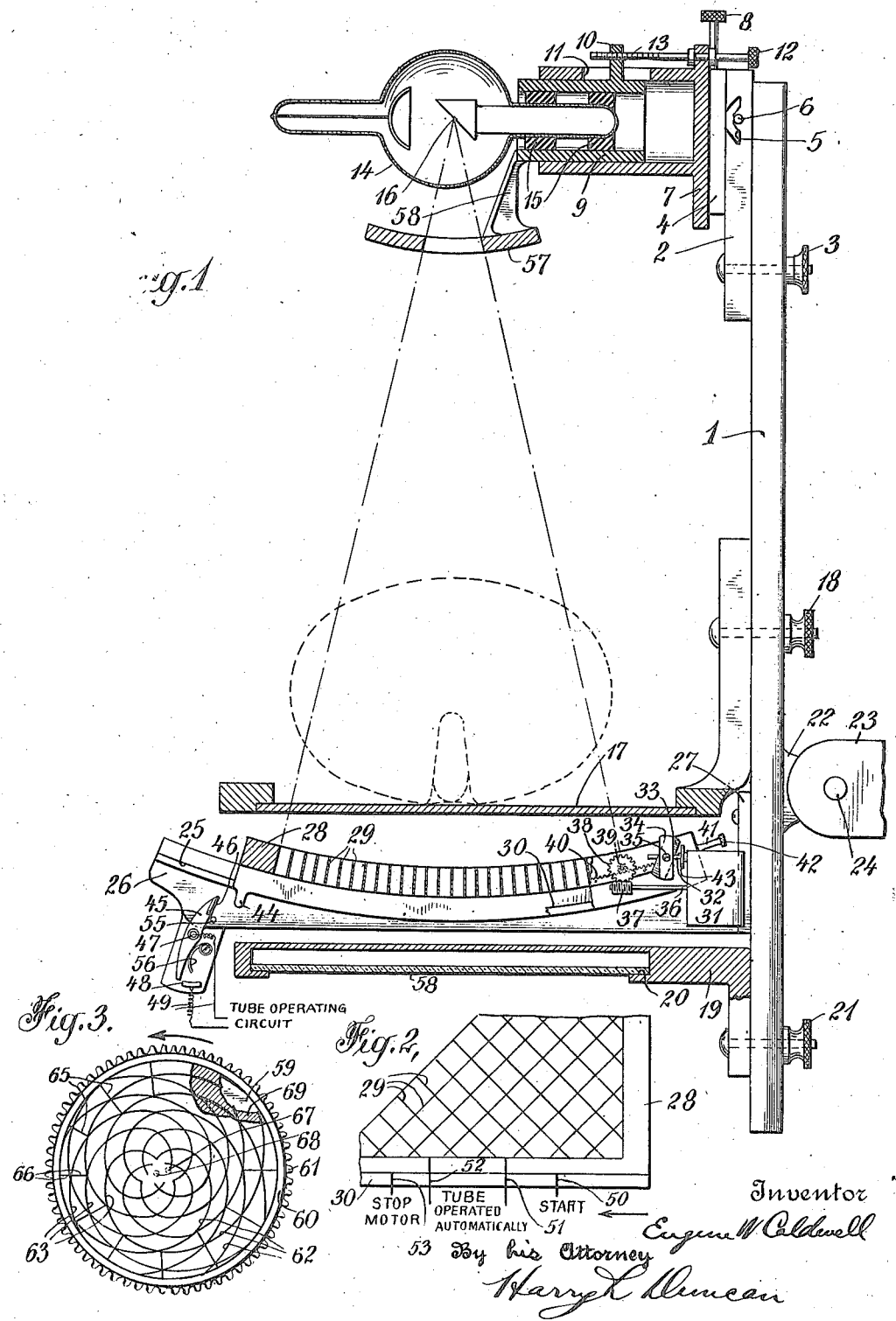

EUGENE W. CALDWELL, OF NEW YORK, N. Y.

X-RAY SCREENING APPARATUS.

1,208,474.     Specification of Letters Patent.     Patented Dec. 12, 1916.

Application filed October 12, 1915. Serial No. 55,378.

*To all whom it may concern:*

Be it known that I, EUGENE W. CALDWELL, a citizen of the United States, and resident of the city, county, and State of New York, have made a certain new and useful Invention Relating to X-Ray Screening Apparatus, of which the following is a specification, taken in connection with the accompanying drawing, which forms part of the same.

This invention relates especially to apparatus for screening or shutting out undesirable secondary radiation, when, for instance, X-ray photographs or radiographs are being taken. For this purpose a cellular screen may be mounted between and preferably close to the subject and the plate. The screens may be movably mounted in a screen guide which may with advantage be of circular form with the tube target as a center, or axis and when the lead strips or other thin screen elements opaque to the X-rays are given a rectangular or square arrangement diagonally arranged with respect to the screen guide and the direction of the oscillating movement of the screen in the guide during the exposure the objectionable localized shadows caused by such screens can be entirely or substantially eliminated. For this purpose the screen during its oscillation may actuate suitable controlling devices so as to automatically start the operation of the X-ray tube and then to automatically stop such operation after the screen has oscillated through a distance corresponding to any even number of times the diagonal width of the screen cells. This promotes the uniform distribution and practical elimination of the shadows caused by the screen members which may also be effected in fluoroscopic work by a continuously moving screen such as a rotary disk screen having intersecting spiral screen members.

In the accompanying drawings showing in a somewhat diagrammatic way an illustrative embodiment of this invention, Figure 1 is a vertical section; Fig. 2 is an enlarged diagram showing the position of the screen cells during the operation of the X-ray tube; Fig. 3 shows a continuously rotating disk screen for fluoroscopic work.

The apparatus may comprise a suitable frame 1 of any desired size and material which may with advantage be movably mounted as for instance by providing a suitable joint member 22 connected as by the pivot 24 with a corresponding swivel joint member 23 on a holder of any description so that in this way the frame and connected parts may be swung into any position, preferably moving about various axes to allow for universal adjustment. A suitable form of adjustable tube support is preferably adjustably mounted on this frame, the bracket 2 of this tube support being adjustably secured to the frame as by the bolt and thumb nut 3 to allow for adjustment or removal when a different character of screen is used, for instance.

The tube support may comprise a series of adjusting slides, such, for instance, as the slide members 2, 4, which may be connected together by the dovetail slide 5 with which the adjusting screw 6 coöperates in the usual way so as to secure the accurate transverse feed or adjustment of these parts in a direction perpendicular to the plane of the drawing. A similar slide adjustment at right angles to this may be secured by the slide members 4, 7 which may be similarly connected and adjusted in relative position by the adjusting screw 8 which may as indicated have a thumb nut for convenient manual adjustment. A third adjustment at right angles to both those above described may be conveniently secured by mounting the tube support 9 within a tubular guide 11 and arranging an adjusting screw 13 between the lug 10 on the tube support and the outer inclosing tube or the plate 7 connected therewith.

An X-ray tube of any suitable type or construction, such as 14, may be mounted within the tube support 9 as by the use of suitable insulating or yieldable members 15 so that its target or focal point 16 is located in the desired position which may of course be adjusted by the various adjusting means connected with the tube support as above described and this tube may be connected in circuit with any suitable form of electric actuating device.

If desired, a suitable subject support, such as the table or bracket 17, may be adjustably mounted on the frame as by the bolt and thumb nut 18, so that its position with respect to the tube and other members mounted on the frame may be adjusted from time to time and the plate support, such as 19, which may if desired have the recess 20 for accommodating a photographic plate holder may be similarly mounted on the frame and securely held in adjusted position by the adjusting bolt and thumb nut 21. The cellular screen which may be of the Bucky type, may be movably mounted between the tube and plate support in any desired way and is preferably mounted adjacent the plate support in any circular screen guide arranged about the tube target as a center or axis. This screen guide 25 may be formed in the guide member 26 firmly secured to the frame in any desired way as by the bracket 27 formed on or secured to the guide and the screen frame or rim 28 may be formed with projecting flanges or guide members 30 shown in Figs. 1 and 2 coöperating with the guide so that the screen may oscillate in the guide so as to move in a circular path which for best results is preferably about the tube target as a center or axis.

The screen members 29 are formed of thin strips of sheet lead or other suitable material opaque to the X-rays and are supported in the screen rim 28 so that they are held preferably in accurate radial position with respect to the tube target. All the screen members are preferably diagonally arranged with respect to the direction of movement of the screen, the best results being secured when they are substantially diagonal or at an angle of about 45 degrees with respect to such movement which promotes the distribution and practical elimination of the screen shadows on the photographic plate. With such an arrangement the size of the screen cells may be greatly reduced while still effectively eliminating undesirable secondary radiation from the subject or other parts of the apparatus out of line with the tube target and this also allows the radial height of the screen members to be correspondingly reduced so that it is possible to secure good results with moving screens of this description in which the cells are no more than an eighth or a quarter of an inch square and where the radial height of the screen members is not more than a half of an inch or an inch.

The screen shadow is most effectively eliminated if the screen elements when arranged in square cells move forward through such distance as equals one or more of the cell diagonals, since if during the photographic exposure while the X-ray tube is in operation the screen members move forward uniformly through a distance equal to the diagonal width of one of the screen cells each of the screen members at the end of the exposure then appears on the photographic plate superimposed on the spot or image which was made at the beginning of the exposure by the screen member ahead.

By oscillating the screen through suitable motor mechanism at substantially constant speed and by arranging automatic controlling devices in connection with the screen so as to automatically stop and start the X-ray tube or otherwise control the exposure the length of the exposure can be so arranged as to correspond accurately to the oscillation of the screen through a distance substantially or exactly equal to any even number of times the diagonal of the screen cells. The time of exposure may under these conditions be controlled by the speed of the screen motor which may be regulated in any desired way so that the desired extent of screen oscillation takes place in the time required to make the correct exposure for the particular subject in question and since the screen guide is given a circular form with respect to the tube target the desired radial position of the screen members is maintained during their oscillation. An arrangement for effecting this automatic control of the exposure is somewhat diagrammatically illustrated in the drawing as comprising a clock-work or electric motor 31 which may be mounted on the screen guide and comprise an adjustable escapement control device such as the escapement fan having two relatively movable members 33, 34, one of which may swing out from behind the other to the extent desired and be held in adjusted position by tightening the screw 35 so that the retarding or controlling effect of this escapement fan is thus adjusted and correspondingly controls the speed of the connected drive shaft 36. This shaft may oscillate the screen through any suitable gearing such, for instance, as the worm 37 on the shaft meshing with the worm wheel 38 with which may be connected the pinion 39 meshing with the circular oscillating rack 40 connected to the screen and oscillating it in the circular screen guide 25.

If desired, any suitable automatic stopping device may be used to stop the oscillation of the screen and this may comprise a stopping device 42 mounted on the screen rim through the somewhat flexible or resilient stem or spring connection 41 so that when the screen oscillates to the desired extent this stopping device is gradually brought into yielding engagement with the brake member 43 on the escapement shaft so as to stop the motor and connected oscillating mechanism. Automatic controlling devices may also be connected in any desired way with the screen or its oscillating mechanism so as to automatically control the duration of exposure in any suitable way. For instance, these controlling devices may comprise an actuating lug or member 44 on the screen and a tube operating switch 45 which may have an insulating contact member 46 arranged in the path of the lug so that when the screen has oscillated sufficiently to bring this lug against the switch the switch is swung about its pivot 47 away from the stop pin 55 with which it is normally held in contact by the spring 56 so that the lower end of the switch is carried into engagement with the coöperating switch member 48, thus closing the tube operating circuit 49 indicated and operating the X-ray tube throughout the time that these switch members remain in engagement. These controlling devices are so arranged with respect to the screen members 29 that the tube is automatically operated during the time that the screen oscillates through a space corresponding to any even number of times the diagonal width of the screen cells.

As indicated in Fig. 2 the screen which is oscillating in the guides in the direction indicated by the arrow may have one of the cell corners start from the point 50 and move to the position 51 when the X-ray tube is automatically started in operation or otherwise rendered effective to cause actinic radiation on the photographic plate. The tube may remain in operation while the screen oscillates through a space corresponding to say, twice the diagonal width of the screen cells or until this part of the screen has reached the point 52 as indicated by the legend, the screen oscillating during this period of exposure at practically constant rate as can be readily effected through a clock-work escapement of this character or through any other suitable form of electric or other actuating motor. As Fig. 2 indicates the automatic stopping device may act so as to stop this part of the screen at the point 53 after the exposure has been completed. It is further understood that if desired a fluoroscopic screen or plate, such as 58, may be inserted in the recess 20 in the plate support 19 and may be used to insure the accurate adjustment of the tube with respect to the screen members. If the X-ray tube which may of course have a diaphragm 57 of lead or the like mounted in connection therewith to cut off undesirable radiation, is operated while the screen is stationary the shadows cast by the thin screen members become visible on the fluoroscopic screen or plate and if these shadows have appreciably greater thickness than the actual thickness of the lead strips constituting the screen members this indicates that the screen members are not in proper radial position with respect to the tube target. The tube is thereupon adjusted in its support until the reduced thickness of the shadows of these screen members indicates that they have been brought into proper radial position so as to interfere to a minimum extent with the radiograph to be taken.

Moving screens of this general type are also of great advantage in connection with X-ray fluoroscopic work since a cellular screen cuts off the instantaneously transmitted secondary radiation which tends to confuse the fluoroscopic image and by giving suitable movement to the screen in any desired way the shadows of the screen members move so rapidly as to be rendered invisible and not to appreciably interfere with visual observation which is thus rendered much more effective than without the screen. The movement of the screen members must for this purpose be sufficiently rapid to give these results with the particular fluoroscopic material used in the screen and with ordinary fluoroscopic material the rate of movement of the screen can readily exceed the persistence of vision under these circumstances so that a practically clear image is secured of much greater sharpness than is possible without the screen, especially when viewing thick body sections. For such fluoroscopic work a screen such as previously described with square or hexagonal cells may be given a continuous oscillation or circular movement of sufficient amplitude to equal, say, several times the cell diameter, this movement being sufficiently rapid throughout all parts of the screen which are within the field of vision so as to eliminate visible shadows of the screen members. This may be effected by any suitable arrangement, as for instance by mounting the screen and its rim so that it can be bodily moved in a plane substantially perpendicular to the plane of Fig. 1, or if desired, by mounting it to have any such movement while guided in a substantially spherical surface about the tube target as a center. Results which are sufficiently accurate for fluoroscopic work may be secured by using a flat cellular screen and rim of this general character and mounting it to move in substantially its own plane. For mechanical reasons, however, it is simpler to use a rotating disk form of screen for fluoroscopic work, the arrangement of screen members or lead strips being such that they always remain substantially radial with respect to the tube target and so that the cells in all active parts of the screen are small enough with respect to their radial height so that they act effectively in the manner described to cut off undesirable secondary radiation which tends to blur the fluoroscopic image. Fig. 3 shows a form of rotating disk screen of this description in which the lead or other screen members opaque to the X-rays may be mounted or more or less supported by sheets 59 of thin aluminum or other suitable material substantially transparent to the X-rays and having sufficient mechanical strength to support the screen members on one or both sides. These plates 59 may be mounted in a circular or stiff rim 60 of any suitable metal which may be revolubly supported in proper position between and closely adjacent the fluoroscopic screen or plate and the subject to be observed and be rotated at the desired speed in any suitable way as through the gear 61 which may be formed on the screen rim itself and driven by any suitable coöperating gear. The thin screen members or lead strips which are mounted within the rim so as always to be maintained in substantially radial-position with respect to the tube target may be given any shape or arrangement so as preferably to form cells which do not have undesirably large area and so that the screen members or their points of intersection are not arranged to an undesirable extent in the same circles of rotation so as to be superimposed by the rotation of the screen and form dark shadow circles or areas.

The screen members may with advantage be given a substantially spiral form or arrangement, either volute or other spiral geometrical forms being employed and the spiral screen members 62 mounted within the rim may as indicated be intersected by the reversely directed spiral members 63 which may with advantage terminate at points which are at different distances from the geometrical center of this spiral screen arrangement. By selecting the pitch, shape and number of the spiral screen members correctly the screen cells may be made of about the right size; and with the six pairs of oppositely directed spiral members indicated which terminate at their inner ends at different points, it is desirable for some purposes to use some supplemental screen members at the outer parts of the arrangement where the spirals are flatter and thus produce cells which have an undesirably great circumferential extent.

If desired the substantially radial supplemental members 65, 66 may be used which extend different distances radially inward so as to subdivide these outer cells to the desired extent and render them effective for cutting off the undesirable X-rays in the way described. In order to minimize the undesirable superposition of the points of intersection of these screen members which tend to be somewhat thicker than their other portions when the screen is made by pressure casting or by soldering or otherwise joining lengths of lead strip or the like, the screen may with advantage be so formed that its center of rotation 67 is at some distance from the geometrical center 68 of the spirals and this center of rotation should of course be sufficiently removed from any of the screen members so as not to shadow the central part of the field in this way. By using the desired number of spiral or other screen members the necessary speed of rotation of the screen is correspondingly reduced so that its speed need not be undesirably high or beyond the effective strength of the materials which may be employed for making the screen.

It is of course understood that if desired the mechanical strength of the screen and the accurate positioning of the various screen members may be further promoted by more or less filling the screen cells with some binding or supporting material 69 which is substantially transparent to the X-rays such, for instance, as bakelite, condensite, celluloid or the like which is shown in the partial sectional portion of Fig. 3 as substantially filling these screen cells.

This invention has been described in connection with a number of illustrative forms, materials, proportions, processes, parts and arrangements, to the details of which disclosure the invention is not of course to be limited, since what is claimed as new and what is desired to be secured by Letters Patent is set forth in the appended claims.

I claim:

1. In X-ray apparatus, a frame adapted to be movably mounted, a tube support on said frame and comprising means for adjusting the position of an X-ray tube with respect to said frame, a plate support adjustably mounted on said frame, a subject support adjustably mounted on said frame, a circular screen guide having the tube target for a center and mounted on said frame between said tube support and said plate support, a cellular screen mounted in said screen guide and comprising a screen rim and thin screen members arranged substantially radially with respect to said tube target to form substantially square opaque screen cells arranged diagonally with respect to said screen guide, a motor mounted on said screen guide and having an adjustable escapement control device, gearing between said motor and said screen to oscillate said screen in said screen guide and controlling devices connected to said screen to automatically start the operation of the X-ray tube and to automatically stop such operation after said screen has oscillated through a space corresponding to an even number of times the diagonal width of the screen cells and to automatically stop said motor.

2. In X-ray apparatus, a frame adapted to be movably mounted, a tube support on said frame and comprising means for adjusting the position of an X-ray tube with respect to said frame, a plate support mounted on said frame, a circular screen guide having the tube target for a center and mounted on said frame between said tube support and said plate support, a cellular screen mounted in said screen guide and comprising a screen rim and thin screen members arranged substantially radially with respect to said tube target to form substantially square opaque screen cells arranged diagonally with respect to said screen guide, a motor mounted on said screen guide and having an adjustable escapement control device, gearing between said motor and said screen to oscillate said screen in said screen guide and controlling devices connected to said screen to automatically start the operation of the X-ray tube and to automatically stop such operation after said screen has oscillated through a space corresponding to an even number of times the diagonal width of the screen cells and to automatically stop said motor.

3. In X-ray apparatus, a frame adapted to be movably mounted, a tube support on said frame, a plate support mounted on said frame, a circular screen guide having the tube target for a center and mounted on said frame between said tube support and said plate support, a cellular screen mounted in said screen guide and comprising a screen rim and thin screen members arranged substantially radially with respect to said tube target to form substantially opaque screen cells arranged diagonally with respect to said screen guide, a motor mounted on said screen guide and having an adjustable escapement control device, gearing between said motor and said screen to oscillate said screen in said screen guide and controlling devices connected to said screen to automatically start the operation of the X-ray tube and to automatically stop such operation after said screen has oscillated through a space corresponding to an even number of times the diagonal width of the screen cells.

4. In X-ray apparatus, a frame adapted to be movably mounted, a tube support on said frame and comprising means for adjusting the position of an X-ray tube with respect to said frame, a plate support mounted on said frame, a subject support mounted on said frame, a circular screen guide having the tube target for a center and mounted on said frame between said tube support and said plate support, a cellular screen mounted in said screen guide and comprising a screen rim and thin screen members arranged substantially radially with respect to said tube target to form substantially square opaque screen cells arranged diagonally with respect to said screen guide, a motor mounted on said frame and having an adjustable escapement control device, connections between said motor and said screen to oscillate said screen in said screen guide and controlling devices connected to said screen to automatically start the effective operation of the X-ray tube and to automatically stop such operation after said screen has oscillated through a space corresponding substantially to an even number of times the diagonal width of the screen cells.

5. In X-ray apparatus, a frame, a tube support on said frame and comprising means for adjusting the position of an X-ray tube with respect to said frame, a plate support mounted on said frame, a circular screen guide having the tube target for a center and mounted on said frame between said tube support and said plate support, a cellular screen mounted in said screen guide and comprising a screen rim and thin screen members arranged substantially radially with respect to said tube target to form substantially square opaque screen cells arranged diagonally with respect to said screen guide, a motor and having an adjustable escapement control device, connections between said motor and said screen to oscillate said screen in said screen guide and controlling devices connected to said screen to automatically start the effective operation of the X-ray tube and to automatically stop such operation after said screen has oscillated through a space corresponding substantially to an even number of times the diagonal width of the screen cells.

6. In X-ray apparatus, a frame, a tube support on said frame and comprising means for adjusting the position of an X-ray tube with respect to said frame, a plate support mounted on said frame, a circular screen guide mounted on said frame between said tube support and said plate support, a cellular screen mounted in said screen guide and comprising thin screen members arranged substantially radially with respect to said tube target to form substantially square opaque screen cells arranged diagonally with respect to said screen guide, a motor having an adjustable speed control device, connections between said motor and said screen to oscillate said screen in said screen guide and controlling devices connected to said screen to automatically stop such operation after said screen has oscillated through a space corresponding substantially to an even number of times the diagonal width of the screen cells.

7. In X-ray apparatus, a frame, a tube support on said frame and comprising means for adjusting the position of an X-ray tube with respect to said frame, a plate support mounted on said frame, a circular screen guide mounted on said frame between said tube support and said plate support, a cellular screen mounted in said screen guide and comprising thin screen members arranged substantially radially with respect to said tube target to form substantially square opaque screen cells arranged diagonally with respect to said screen guide, a motor, connections between said motor and said screen to oscillate said screen in said screen guide and controlling devices connected to said screen to automatically start the effective operation of the X-ray tube and to automatically stop such operation after said screen has oscillated through a space corresponding substantially to an even number of times the diagonal width of the screen cells.

8. In X-ray apparatus, a frame adapted to be movably mounted, a tube support on said frame, a plate support mounted on said frame, a curved screen guide mounted on said frame between said tube support and said plate support, a cellular screen mounted in said screen guide and comprising a screen rim and thin screen members arranged substantially radially with respect to said tube target to form substantially opaque screen cells angularly arranged with respect to said screen guide, a motor on said frame and having an adjustable speed control device, gearing between said motor and said screen to oscillate said screen in said screen guide and controlling devices connected to said screen to automatically start the operation of the X-ray tube and to automatically stop such operation after said screen has oscillated through a space corresponding to an even number of times the diagonal width of the screen cells.

9. In X-ray apparatus, a frame adapted to be movably mounted, a tube support on said frame, a plate support mounted on said frame, a curved screen guide mounted on said frame between said tube support and said plate support, a cellular screen mounted in said screen guide and comprising a screen rim and thin screen members arranged substantially radially with respect to said tube target to form substantially opaque screen cells angularly arranged with respect to said screen guide, a motor on said frame and having an adjustable speed control device, connections between said motor and said screen to move said screen in said screen guide and controlling devices connected to said screen to automatically start the effective operation of the X-ray tube and to automatically stop such operation after said screen has moved at substantially uniform speed through a space corresponding to an even number of times the extreme extent of one of the screen cells in the direction of movement of the screen.

10. In X-ray apparatus, a frame, a tube support on said frame, a plate support mounted on said frame, a screen guide mounted on said frame between said tube support and said plate support, a cellular screen mounted in said screen guide and comprising thin screen members arranged substantially radially with respect to said tube target to form substantially opaque screen cells angularly arranged with respect to said screen guide, a motor on said frame and having an adjustable speed control device, connections between said motor and said screen to move said screen in said screen guide and controlling devices connected to said screen to automatically start the effective operation of the X-ray tube and to automatically stop such operation after said screen has moved at substantially uniform speed through a space corresponding to an even number of times the extreme extent of one of the screen cells in the direction of movement of the screen.

11. In X-ray apparatus, a frame, a tube support on said frame, a plate support mounted on said frame, a screen guide mounted on said frame between said tube support and said plate support, a cellular screen mounted in said screen guide and comprising thin screen members arranged substantially radially with respect to said tube target to form substantially opaque screen cells angularly arranged with respect to said screen guide, a motor on said frame, connections between said motor and said screen to move said screen in said screen guide and controlling devices to automatically start the effective operation of the X-ray tube and to automatically stop such operation after said screen has moved at substantially uniform speed through a space corresponding to an even number of times the extreme extent of one of the screen cells in the direction of movement of the screen.

12. In X-ray apparatus, a frame, a tube support on said frame and comprising means for adjusting the position of an X-ray tube with respect to said frame, a plate support mounted on said frame, a circular screen guide mounted on said frame between said tube support and said plate support, a cellular screen mounted in said screen guide and comprising thin screen members arranged substantially radially with respect to the tube target to form substantially square opaque screen cells arranged diagonally with respect to said screen guide, a motor, connections between said motor and said screen to oscillate said screen in said screen guide at substantially uniform speed after its starting movement and controlling devices connected to said screen to automatically start the effective operation of the X-ray tube and to automatically stop such operation after said screen has oscillated at substantially uniform speed through a space corresponding substantially to an even number of times the diagonal width of the screen cells.

13. In X-ray apparatus, a frame, a tube support on said frame, a plate support mounted on said frame, a screen guide mounted on said frame between said tube support and said plate support, a cellular screen mounted in said screen guide and comprising thin screen members arranged substantially radially with respect to the tube target to form substantially square opaque screen cells arranged diagonally with respect to said screen guide, a motor, connections between said motor and said screen to oscillate said screen in said screen guide at substantially uniform speed after its starting movement and controlling devices connected to said screen to automatically start the effective operation of the X-ray tube and to automatically stop such operation after said screen has oscillated at substantially uniform speed through a space corresponding substantially to an even number of times the diagonal width of the screen cells.

14. In X-ray apparatus, a tube support, a coöperating plate support, a cellular screen movably mounted between said tube support and said plate support and comprising thin screen members arranged substantially radially with respect to the target of the X-ray tube to form substantially uniformly spaced square opaque screen cells diagonally arranged with respect to the movement of said screen, controlling devices connected to said screen to automatically start the effective operation of the X-ray tube and to automatically stop such operation after said screen has moved through the space corresponding substantially to an even number of times the diagonal width of the screen cells and means to move said screen at substantially uniform speed during the effective operation of the X-ray tube.

15. In X-ray apparatus, an X-ray tube support, a coöperating plate support for a photographic plate, a cellular screen movably mounted between said tube support and said plate support and comprising thin screen members arranged substantially radially with respect to the target of the X-ray tube to form substantially uniformly spaced opaque screen cells angularly arranged with respect to the movement of said screen, controlling devices connected to said screen to automatically start the effective operation of the X-ray tube and to automatically stop such operation after said screen has moved through the space corresponding substantially to an even number of times the extreme extent of one of the screen cells in the direction of movement of the screen and comprising a speed regulating device and means to move said screen at substantially uniform speed during the effective operation of the X-ray tube.

16. In X-ray apparatus, an X-ray tube support, a coöperating plate support for a photographic plate, a cellular screen movably mounted between said tube support and said plate support and comprising thin screen members arranged substantially radially with respect to the target of the X-ray tube to form opaque screen cells angularly arranged with respect to the movement of said screen, controlling devices connected to said screen to automatically start the effective operation of the X-ray tube and to automatically stop such operation after said screen has moved through the space corresponding substantially to an even number of times the extreme extent of one of the screen cells in the direction of movement of the screen and means to move said screen at substantially uniform speed during the effective operation of the X-ray tube.

17. In X-ray apparatus, a tube support, a coöperating plate support for a photographic plate, a screen movably mounted between said tube support and said plate support and comprising thin screen members arranged substantially radially with respect to the target of the X-ray tube to form substantially uniformly spaced square opaque screen elements diagonally arranged with respect to the movement of said screen, controlling devices connected to said screen to automatically start the effective operation of the X-ray tube and to automatically stop such operation after said screen has moved a predetermined distance and means to move said screen at substantially uniform speed during the effective operation of the X-ray tube.

18. In X-ray apparatus, a tube support, a coöperating plate support for a photographic plate, a screen movably mounted between said tube support and said plate support and comprising screen members arranged substantially radially with respect to the target of the X-ray tube to form substantially uniformly spaced opaque screen elements angularly arranged with respect to the movement of said screen, controlling devices connected to said screen to automatically start the effective operation of the X-ray tube and to automatically stop such operation after said screen has moved a predetermined distance and means to move said screen.

19. In X-ray apparatus, a tube support, a coöperating plate support for a photographic plate, a screen movably mounted between said tube support and said plate support and comprising thin opaque screen members arranged to cut off undesirable secondary radiation, controlling devices connected to said screen to automatically start the effective operation of the X-ray tube and to automatically stop such operation after said screen has moved a predetermined distance and means to move said screen at substantially uniform speed during the effective operation of the X-ray tube.

20. In X-ray apparatus, a tube support, a coöperating plate support for a photographic plate, a screen movably mounted between said tube support and said plate support and comprising screen members arranged substantially radially with respect to the target of the X-ray tube to form substantially uniformly spaced opaque screen elements transversely arranged with respect to the movement of said screen, controlling devices connected to said screen to automatically start the effective operation of the X-ray tube and to automatically stop such operation after said screen has moved a predetermined distance and means to move said screen.

21. In X-ray apparatus, a tube support, a coöperating plate support for a photographic plate, a screen movably mounted between said tube support and said plate support and comprising thin opaque screen members arranged to cut off undesirable secondary radiation, means to prevent contact of the subject with said screen, controlling devices connected to said screen to automatically start the effective operation of the X-ray tube and to automatically stop such operation after said screen has moved a predetermined distance and means to move said screen at substantially uniform speed during the effective operation of the X-ray tube.

22. In X-ray apparatus, a tube support, a coöperating plate support for a photographic plate, a screen movably mounted between said tube support and said plate support and comprising screen members arranged substantially radially with respect to the target of the X-ray tube to form substantially uniformly spaced opaque screen elements transversely arranged with respect to the movement of said screen, means to prevent contact of the subject with said screen, controlling devices connected to said screen to automatically start the effective operation of the X-ray tube and to automatically stop such operation after said screen has moved a predetermined distance and means to move said screen.

23. In X-ray apparatus, an X-ray tube support, a coöperating plate support for a photographic plate, a screen movably mounted between said tube support and said plate support and comprising thin screen members arranged substantially radially with respect to the target of the X-ray tube to form opaque screen elements transversely arranged with respect to the movement of said screen, controlling devices connected to said screen to automatically start the effective operation of the X-ray tube and to automatically stop such operation after said screen has moved through the space corresponding substantially to an even number of times the extreme extent of one of the screen elements in the direction of movement of the screen and means to move said screen at substantially uniform speed during the effective operation of the X-ray tube.

EUGENE W. CALDWELL.

Witnesses:
HARRY L. DUNCAN,
JESSIE B. KAY.